United States Patent
Kang

(10) Patent No.: US 7,375,512 B2
(45) Date of Patent: May 20, 2008

(54) ROTARY INPUT APPARATUS INCLUDING A PERMANENT MAGNET RING, AN ELECTROMAGNET, A DRIVING AND CONTROL MEANS

(75) Inventor: Eung-Cheon Kang, Hwaseong-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 69 days.

(21) Appl. No.: 11/583,036

(22) Filed: Oct. 19, 2006

(65) Prior Publication Data

US 2007/0268249 A1 Nov. 22, 2007

(30) Foreign Application Priority Data

May 18, 2006 (KR) .................. 10-2006-0044840

(51) Int. Cl.
  *G01B 7/30* (2006.01)
(52) U.S. Cl. .............................. 324/207.25; 324/207.2
(58) Field of Classification Search ........ 324/173–174, 324/207.2–207.25; 338/32 H, 32 R
See application file for complete search history.

(56) References Cited

U.S. PATENT DOCUMENTS

| | | | |
|---|---|---|---|
| 6,367,337 B1 * | 4/2002 | Schlabach ............. | 73/862.331 |
| 6,396,259 B1 * | 5/2002 | Washeleski et al. ... | 324/207.22 |
| 6,836,039 B2 * | 12/2004 | Choi et al. ............... | 310/81 |
| 6,864,679 B2 * | 3/2005 | Yokoji et al. .......... | 324/207.11 |
| 7,095,198 B1 * | 8/2006 | O'Brien .................... | 318/432 |
| 7,322,115 B2 * | 1/2008 | Besier et al. ............ | 33/1 PT |
| 2003/0019113 A1 * | 1/2003 | Kofink et al. ............ | 33/1 PT |
| 2005/0022617 A1 * | 2/2005 | Sano ......................... | 73/865.9 |

* cited by examiner

*Primary Examiner*—Jay M Patidar

(57) ABSTRACT

A rotary input apparatus is disclosed. As the rotary input apparatus comprises a rotatable wheel; a magnet joined to a surface of the wheel to co-operate with the wheel and magnetized to have alternating N- and S-poles; an electromagnet part positioned facing the magnet and magnetized to have at least N- or S-pole; a printed circuit board, to which the electromagnet part is joined, including a driving part which supplies an electrical current to the electromagnet part, and a detection element which receives electrical power from the driving part for operation, is positioned facing the magnet, and which detects the rotation of the magnet; a control part which receives a signal and controls the operation of the driving part in correspondence with the received signal; and a base to which the printed circuit board is secured, various types of input may be made through the rotation speed, direction, and angle, etc., and rotation or vibration may be obtained from electrical external signals, to provide an improved visual service.

6 Claims, 5 Drawing Sheets

ROTARY INPUT APPARATUS INCLUDING A PERMANENT MAGNET RING, AN ELECTROMAGNET, A DRIVING AND CONTROL MEANS

CROSS-REFERENCE TO RELATED APPLICATIONS

This application claims the benefit of Korean Patent Application No. 2006-0044840 filed with the Korean Intellectual Property Office on May 18, 2006, the disclosure of which is incorporated herein by reference in its entirety.

BACKGROUND

1. Technical Field

The present invention relates to a rotary input apparatus.

2. Description of the Related Art

In general, a mobile terminal has the numbers 0-9 and the symbols * and # on a keypad of 12 keys. In addition to the numbers, there are also alphabet letters as well as consonants and vowels of Korean letters marked on such a keypad, to enable the input of numbers and letters. There are also navigation keys formed above the keypad equipped with a variety of functions such as searching phone numbers, writing and managing text messages, and connecting to the Internet, etc. While there are various forms of navigation keys, such as button types and rotary types, etc., the use of rotary input apparatus is currently increasing, as they enable various functions such as menu browsing, etc.

With the widespread use of such rotary input apparatus, there is a desire among users for visual elements, on top of the general functions of the apparatus. In the conventional rotary input apparatus, however, only the basic functions for input by rotation are implemented, so that the users' demands for improved convenience and greater aesthetic value are not fully being satisfied, and various functions still have not yet been implemented such as incoming signal announcing, in which the rotary input apparatus is actuated in response to an incoming signal.

SUMMARY

The present invention aims to provide a rotary input apparatus which allows improved convenience and greater aesthetic value, as the rotary input apparatus capable of various types of input through the rotation speed, direction, and angle, etc., is made to rotate or vibrate, etc., in response to externally inputted signals.

One aspect of the invention provides a rotary input apparatus comprising a rotatable wheel; a magnet joined to a surface of the wheel to co-operate with the wheel and magnetized to have alternating N- and S-poles; an electromagnet part positioned facing the magnet and magnetized to have at least one N- or S-pole; a printed circuit board, to which the electromagnet part is joined, including a driving part which supplies an electrical current to the electromagnet part, and a detection element which receives electrical power from the driving part for operation, is positioned facing the magnet, and which detects the rotation of the magnet; a control part which receives a signal and controls the operation of the driving part in correspondence with the received signal; and a base to which the printed circuit board is secured.

Embodiments of the rotary input apparatus may have one or more of the following features. For example, the base may be joined to a mobile terminal, and the control part may receive incoming signals received by the mobile terminal, while a rotation axis may be joined to the center portion of the wheel, with the rotation axis formed to be supported by the base. Also, a guide part may additionally be formed, which guides the rotation of the wheel at a position adjacent to a perimeter portion of the wheel and which is joined to the base, to allow the rotation of the wheel without the rotation axis. Meanwhile, when an external signal is received, the control part may control the operation of the driving part to block the electrical power supplied to the detection element, in order to avoid the possibility of unintentional input being made when the magnet and wheel are rotated due to an external signal. Further, the electromagnet part may include a plurality of electromagnets arranged in constant intervals radially about the center of the printed circuit board. This allows a more stable rotation of the magnet and the wheel joined to the magnet, as the force applied by the electromagnets on the magnet may be provided uniformly.

Additional aspects and advantages of the present invention will be set forth in part in the description which follows and in part will be obvious from the description, or may be learned by practice of the invention.

DETAILED DESCRIPTION

Figure 1:
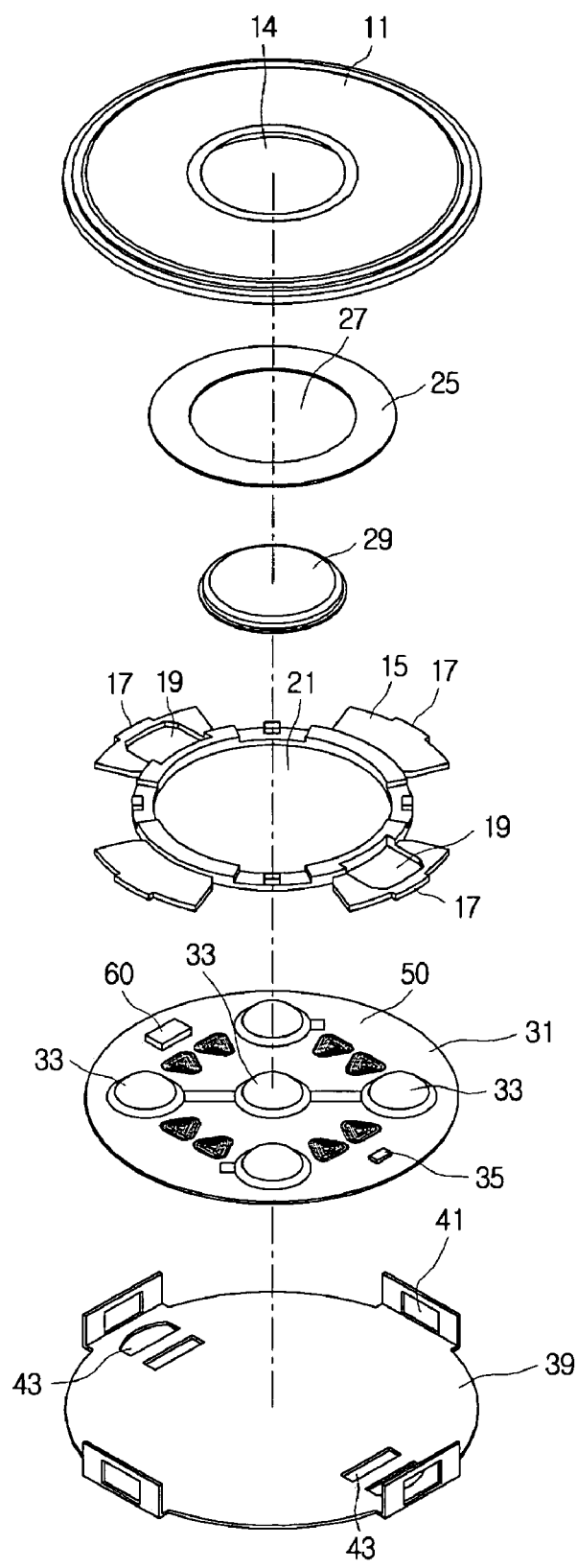
FIG. 1 is an exploded perspective view of a rotary input apparatus according to an embodiment of the invention.
Figure 2:
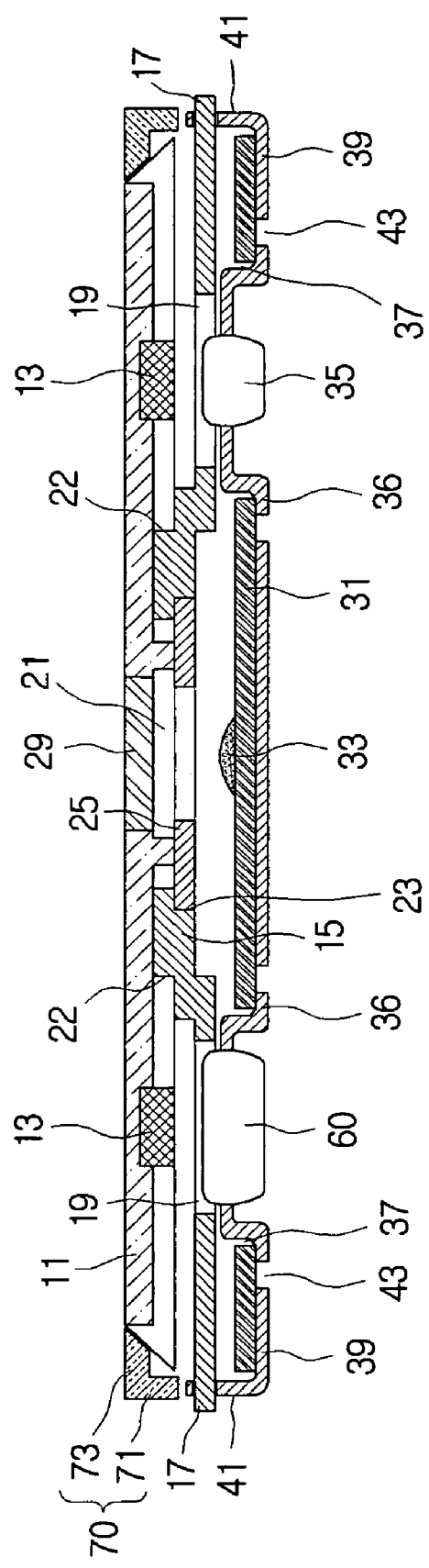
FIG. 2 is a cross-sectional view of a rotary input apparatus according to an embodiment of the invention.

Below, embodiments of the rotary input apparatus according to the invention will be described in more detail with reference to the accompanying drawings. In the description with reference to the accompanying drawings, those components are rendered the same reference number that are the same or are in correspondence regardless of the figure number, and redundant explanations are omitted. FIG. 1 is an exploded perspective view illustrating a rotary input apparatus according to an embodiment of the invention in an unassembled state, and FIG. 2 is a cross-sectional view illustrating a rotary input apparatus according to an embodiment of the invention in an assembled state. In FIGS. 1 and 2 are illustrated a wheel 11, a center hole 14, a washer 25, a center key 29, a holder 15, fastening portions 17, holder holes 19, a center hole 21, a printed circuit board 31, dome buttons 33, a Hall sensor 35, an electromagnet part 50, a control part 60, a base 39, fastening holes 41, insertion holes 43, and a guide part 70. A rotary input apparatus according to the present embodiment may comprise a rotatably joined wheel 11, a washer 25, a center key 29 joined at the center of the wheel 11, a ring-shaped magnet 13 secured to the bottom of the wheel 11 which rotates together with the wheel 11, a holder 15 joined to the base 39 which rotatably supports the wheel 11, a printed circuit board 31 joined to the upper surface of the base 39, a Hall sensor 35 positioned in a groove of the printed circuit board 31 which is a detection element for sensing the rotation of the magnet 13, a control part 60 positioned in another groove of the printed circuit board which receives and processes external signals and then transmits the processed signals, an electromagnet part 50 positioned in other grooves of the printed circuit board 31 which receives signals from the control part 60 to allow the flow of an electrical current, and a guide part 70 capable of stably supporting the rotation of the wheel 11. In the rotary input apparatus according to the present embodiment, the electromagnet part 50, and the control part 60 which can control the electrical current flowing through the coil patterns 50, are formed on the printed circuit board 31, so that the wheel 11 may be rotated not only by external forces applied by the user, but also by electrical signals, etc., from the outside, whereby the user may be provided with an improved visual effect.

The wheel 11 may generally be shaped as a circular plate, with a center hole 14 formed in the center through which the center key 29 may be inserted. The wheel 11 may have a plurality of securing protrusions adjacent to the center hole 14 that protrude downwards. The securing protrusions may be inserted into the center hole of the washer 25, so that the wheel 11 is secured to the holder 15. The wheel 11 may be rotatably secured to the holder 15, and on the bottom surface of the wheel 11 may be secured the magnet 13, which is magnetized to have multiple poles. The wheel 11 may be rotated together with the magnet 13 by user operation, whereby a variety of inputs may be made as the Hall sensor 35 senses the rotation angle, direction, and speed, etc., of the magnet 13. Also, a portion may be pressed by the user, so that a push protrusion formed on the reverse side of the holder 15 presses the upper surface of a dome button 33 to activate a separate function.

The securing protrusions 12, as illustrated in FIG. 2, may be inserted through the center hole 21 of the holder 15 and the center hole of the washer 25. The washer 25 is inserted and secured onto the center of the holder 15, whereby the wheel 11 may be secured to the holder 15.

The magnet 13 is attached to the bottom surface of the wheel 11 to be rotated together with the wheel 11, and such rotation of the magnet 13 may be sensed by the Hall sensor 35 for an input based on the rotation angle. The magnet 13 may have the shape of a ring magnetized to have multiple poles, and the Hall sensor 35 may detect the rotation angle, direction, and speed of the wheel 11 according to changes in N- and S-poles above the Hall sensor 35.

The holder 15 may be secured to the base 39 and may rotatably support the wheel 11. Also, the holder 15 may support the wheel 11, such that when the particular force applied on the wheel 11 is removed, the wheel 11 is returned to its original position due to the elasticity of the holder 15 itself. As illustrated in FIG. 1, the holder 15 may have a center hole 21 in the middle, and holder holes 19 may be formed in fastening portions 17 that protrude in four directions around the center hole 21. The holder 15 may also have ledges 23 formed adjacent the center hole 21.

The fastening portions 17 are protrusion portions formed in particular intervals around the holder 15, and as illustrated in FIG. 2, may be inserted into the fastening holes 41 of the base 39 to prevent the base 39 from becoming detached. The fastening portions 17 may be made of metal or plastic, etc., to have a certain degree of elasticity, and this elasticity may enable the wheel 11 to recover its original position, even when a particular portion of the wheel 11 is pressed so that the wheel 11 becomes tilted.

The holder holes 19 formed in the fastening portions 17 are formed in correspondence with the Hall sensor 35 mounted on the printed circuit board 31, and as illustrated in FIG. 2, hold a portion of the Hall sensor 35. The center hole 21 is formed in the center of the holder 15. Also, the wheel 11 may be rotatably inserted onto a perimeter 22 forming the center hole 21, to prevent the wheel 11 from becoming detached. The ledges 23, as illustrated in FIG. 2, may be formed adjacent to the center hole 21, and the washer 25 may be inserted and secured onto the ledges 23.

As illustrated in FIG. 1, a generally circular center hole may be formed in the washer 25. The washer 25 may be inserted and secured onto the ledges 23 and may allow the wheel 11 to freely rotate 360 degrees.

The center key 29 may be inserted through the center hole 14 of the wheel 11 and may be supported by elastic rubber (not shown), etc. The center key 29 may be pressed by the user to perform a particular function, examples of which include connecting to the Internet or receiving DMB (Digital Multimedia Broadcasting), etc.

The printed circuit board 31 may have the shape of a circular plate in correspondence with the base 39, with a plurality of dome buttons 33 formed on one side in correspondence with the push protrusions formed on the reverse side of the holder 15. Also on the printed circuit board 31 may be formed the electromagnet part 50 and the control part 60 which controls the operation of the electromagnet part 50, which will be described later in more detail.

The dome buttons 33 are pressed by push protrusions (not shown) formed on the reverse side of the holder 15 to perform separate functions. While in this embodiment dome buttons 33 are illustrated that are pressed by the wheel 11, any composition may be used in which certain pressing performs separate functions. For example, pressure sensors or contact sensors may also be used instead of the dome buttons 33.

The electromagnet part 50, in reference to FIG. 1, may be formed on the printed circuit board 31, may be formed as coils wound in the shape of triangles, and as will be described later in more detail, may receive signals from the control part 60 for the flow of an electrical current. It is advantageous for the electromagnet part 50 to be arranged in constant intervals radially about the dome button 33 formed at the center of the printed circuit board 31. This is because when it is not arranged in constant intervals so that there is an imbalance in angles, the forces applied by the electromagnet part 50 with respect to the magnet 13 are not formed uniformly, so that it is difficult for the magnet 13, and the wheel 11 joined with the magnet 13, to rotate in a stable manner. While in the present embodiment the electromagnet part 50 is presented as forming an angular balance in 90 degrees about the center of the printed circuit board 31, it is obvious that the number and configuration of the electromagnets may be varied according to design requirements.

Figure 3:
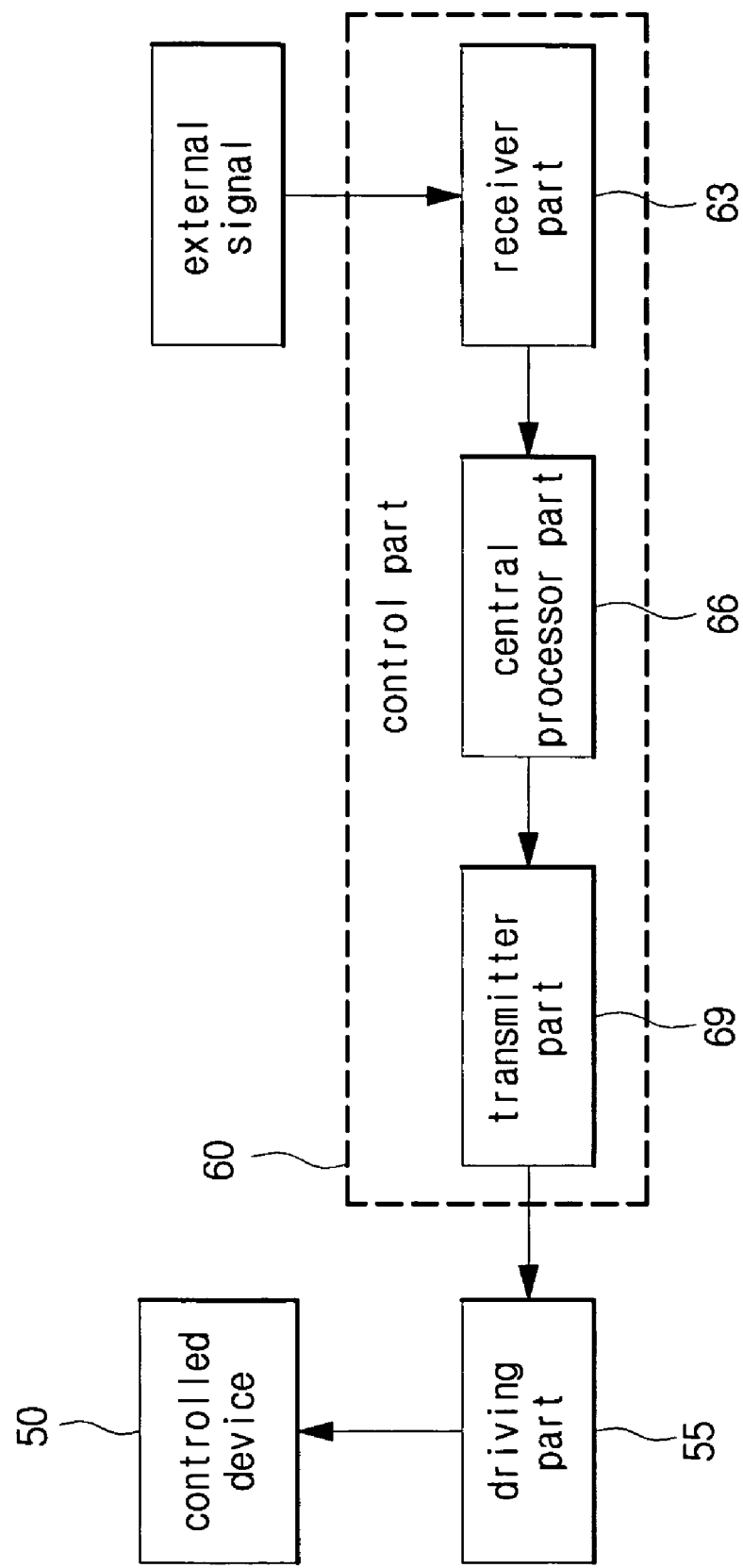
FIG. 3 is a block diagram illustrating the flow of a signal in a rotary input apparatus according to an embodiment of the invention.

FIG. 3 is a block diagram illustrating the flow of a signal in a rotary input apparatus according to an embodiment of the invention. Referring to FIG. 3, the control part 60 is illustrated, which is composed of a receiver part 63, a central processor part 66, and a transmitter part 69, as well as the flow of a signal, when there is an external signal, which starts from the external signal, proceeds through the control part 60, and reaches a controlled unit (e.g. the electromagnet part 50 or the detection element 35).

The control part 60, in reference to FIG. 3, may include a receiver part 63 which receives signals, a central processor part 66 which processes the received signals, and a transmitter part 69 which transmits the control signals processed at the central processor part 66 to the driving part 55. Also, the driving part 55 may be positioned between the transmitter part 69 and the electromagnet part 50 to receive control signals from the transmitter part 69 and correspondingly allow the flow of an electrical current to the electromagnet part 50.

Figure 4:
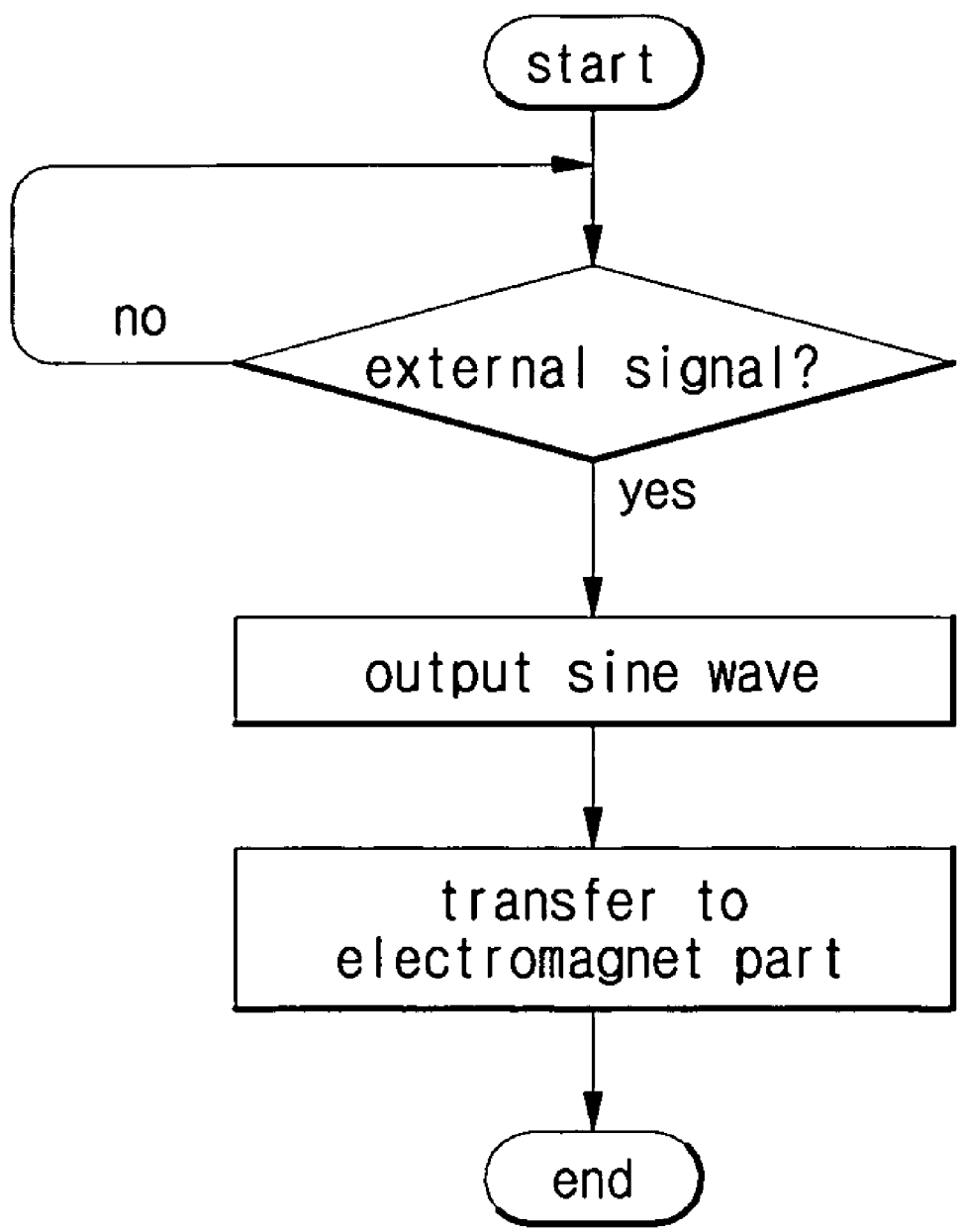
FIG. 4 is a flowchart illustrating an operation of a rotary input apparatus according to an embodiment of the invention.

Using as an example the case where the rotary input apparatus according to the present embodiment is formed in a mobile terminal, in reference to FIG. 4, the central processor part 66 may output a control signal that instructs the driving part not to output any signal when there are no incoming signals (e.g. during stand-by), whereas it may output a control signal that instructs the driving part 55 to output a sine wave when there is an incoming signal (e.g. when there is an incoming phone call or a text message). Meanwhile, the incoming signal may include both signals received from a communication station or relay station, etc., and signals generated by the mobile terminal itself (e.g. signals generated by button input). While in the present invention sine waves are illustrated as the signals provided by the driving part 55 to the electromagnet part 50, it is obvious that various forms of signals may be outputted according to user preferences and design requirements, and it is also obvious that predetermined signals may be outputted even when there are no external signals received.

Figure 5:
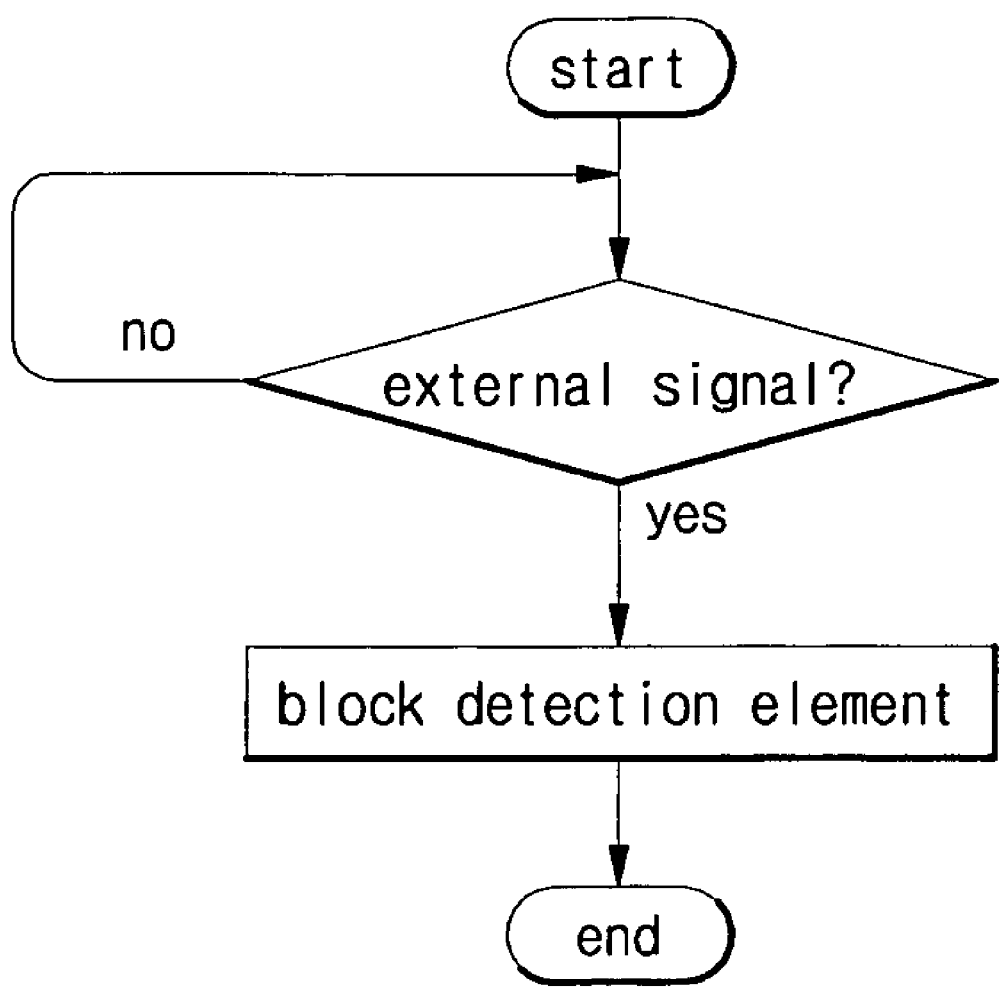
FIG. 5 is a flowchart illustrating an operation of a rotary input apparatus according to another embodiment of the invention.

FIG. 5 is a flowchart illustrating an operation of a rotary input apparatus according to another embodiment of the invention. The control part 60, in reference to FIG. 5, may allow the Hall sensor 35 to operate normally when there are no external signals received (e.g. during stand-by) while stopping the function of the Hall sensor 35 when an external signal is received. In this case, if the function of the Hall sensor 35 is not stopped, a signal is generated and inputted to the Hall sensor 35, due to the rotation of the magnet 13, whereby the rotary input apparatus performs a predetermined function (e.g. switching to a text message input mode), and an operation is executed that is not intended by the user. Thus, a means to stop the function of the Hall sensor 35 is necessary to avoid such malfunctions, to prevent the occurrence of unintended input created as the Hall sensor 35 identifies signals generated due to the rotation of the magnet 13, etc.

Receiving holes 37 may be formed in the printed circuit board 31 in correspondence with the holder holes 19 of the holder 15, and at least a portion of the detection element 35 may be positioned in the receiving hole 37, as illustrated in FIG. 2. Thus, compared to the case of mounting the detection element 35 on the upper surface of the printed circuit board 31, this embodiment may provide the additional effect of reducing the thickness of the input apparatus by the depth of the receiving hole 37.

The detection element may be a Hall sensor (Hall effect sensor), which is a silicon semiconductor using the effect of electromotive forces generated when electrons experience the Lorentz force in a magnetic field such that their direction is curved. The Hall sensors generate electromotive forces that are proportional to the rotation of the magnet 13 attached to the wheel 11, which are transferred via the printed circuit board 31 to an outside control unit (not shown).

Of course, the detection element is not limited to a Hall sensor, and any element may be used which can detect the rotation of the magnet 13. For example, an MR (magneto-resistive) sensor or a GMR (giant magneto-resistive) sensor may be used for the detection element. An MR sensor or a GMR sensor is an element of which the resistance value is changed according to changes in the magnetic field, and utilizes the property that electromagnetic forces curve and elongate the carrier path in a solid to change the resistance. Not only are the MR sensor and GMR sensor small in size with high signal levels, but also they have excellent sensitivity to allow operation in low-level magnetic fields, and they are also superior in terms of temperature stability.

When the detection element is a Hall sensor 35, the Hall sensor 35 is secured to the printed circuit board 31 by leads 36, where the leads 36 are inserted through the insertion holes 43 of the base 39 and secured to the reverse side of the printed circuit board 31.

The base 39, as illustrated in FIG. 1, has the shape of a circular plate, and rotatably supports the holder 15 and the wheel 11. The base 39 has fastening holes 41 around it in correspondence with the fastening portions 17 of the holder 15. The fastening portions 17 of the holder 15 are inserted into the fastening holes 41 of the base 39. Also, insertion holes 43 are formed on the base 39 in correspondence with the receiving holes 37 of the printed circuit board 31. As illustrated in FIG. 3, portions of the Hall sensors 35 are positioned in the insertion holes 43, whereby the thickness of the rotary input apparatus may further be reduced by the depth of the insertion holes 43.

Meanwhile, a rotational axis (not shown) may be formed in the center portion of the base 39. In this case, a hole may be formed in the printed circuit board in a position and size corresponding with the rotational axis. Then, the rotational axis may have one end formed on the base 39, and may penetrate the hole formed on the printed circuit board so that the other end of the rotational axis may be formed in contact with the wheel 11 or the center key 29, in order thus to support the wheel 11 for stable rotation.

Also, a guide part 70 may be formed on the base 39 for the stable rotation of the wheel 11. The guide part 70 may comprise a stem 71 extending along the outer perimeter of the base 39 in a direction where the wheel is formed, and a curve portion 73 curvedly extending from the stem 71 and covering at least a portion of the wheel 11. The guide part 70 prevents the wheel 11 from becoming detached due to excessive rotation.

A description will now be provided on the operation of the rotary input apparatus according to the present embodiment.

When a rotational force is applied by a user on an outer side of the center key 29, the wheel 11 is rotated while inserted onto the perimeter 22 of the holder 15, which causes the magnet 13 to rotate together with the wheel 11. As the magnet 13 has a multiple number of alternately magnetized N- and S-poles, the Hall sensor 35 can sense the changes in poles due to the rotation of the magnet 13, to recognize the rotation direction, speed, and angle of the wheel 11. The Hall sensor 35 generates output signals corresponding to the rotation direction, rotation angle, and rotation speed of the wheel 11, which are transmitted via the printed circuit board 31 to an outside control unit, and the control unit identifies the output signals to perform an input corresponding to the rotation of the wheel 11.

Further, when an outer side of the center key 29 is pressed by a user, the wheel 11 is tilted in one direction while elastically supported by the holder 15, which causes a push protrusion (not shown) formed on the reverse side of the holder 15 to press a dome button 33. This allows each of the dome buttons 33 positioned on the printed circuit board 31 to perform its own function. For example, in the input apparatus illustrated in FIGS. 1 and 2, there are four equally spaced dome buttons 33 that can be pressed by the push protrusions, where each dome button 33 may function as a hot key for launching a text message function, searching phone numbers, connecting to the Internet, or receiving satellite broadcasts, etc. In addition, the center key 29 may also perform a separate function when pressed by a user.

Meanwhile, according to an embodiment of the invention, when the rotary input apparatus is formed on a device capable of receiving an external signal (e.g. a mobile terminal), the central processor part 66 does not make the driving part 55 output any signals during stand-by, so that there is no electric current flowing through the electromagnet part 50. Thus, there is no electric field formed by the electromagnet part 50, and there is no force applied on the magnet 13. This allows the wheel 11 not to rotate and to remain still. On the other hand, when there is a received signal, such as for an incoming phone call or a received text message, the central processor part 66 makes the driving part 55 output a sine wave, etc., which is transferred to the electromagnet part 50, so that there is an electric current flowing through the electromagnet part 50. When an electric current is made to flow through the electromagnet part 50, the flow of the electric current forms an electric field, whereby a force is applied on the magnet 13. Here, by supplying an alternating current such as of a sine wave, there are changes in the direction of the force, due to the changes in the magnetic field, so that the magnet 13 is able to rotate, as well as the wheel 11 that is formed as a single body with the magnet 13. Since the signals inputted to the Hall sensor 35 by the rotation of the magnet 13 are blocked by the control part 60, unintended input may be avoided.

Many embodiments, besides the embodiments set forth above, are encompassed within the claims of the present invention.

According to embodiments of the present invention comprised as set forth above, a rotary input apparatus may be provided which allows improved convenience and greater aesthetic value, as the rotary input apparatus designed to be capable of various types of input through the rotation speed, direction, and angle, etc., is made to rotate or vibrate, etc., in response to externally inputted signals.

While the present invention has been described with reference to particular embodiments, it is to be appreciated that various changes and modifications may be made by those skilled in the art without departing from the spirit and scope of the present invention, as defined by the appended claims and their equivalents.

What is claimed is:

1. A rotary input apparatus comprising:
   a rotatable wheel;
   a magnet joined to a surface of the wheel to co-operate with the wheel and magnetized to have alternating N- and S-poles;
   an electromagnet part positioned facing the magnet and magnetized to have at least one N- or S-pole;
   a printed circuit board having the electromagnet part joined thereto, the printed circuit board comprising a driving part for supplying an electrical current to the electromagnet part, and a detection element, receiving electrical power from the driving part for operation and positioned to face the magnet, for detecting the rotation of the magnet;
   a control part, for receiving a signal and controlling the operation of the driving part in correspondence with the received signal; and
   a base having the printed circuit board secured thereto.

2. The rotary input apparatus of claim 1, wherein the base is joined to a mobile terminal, and the control part receives incoming signals received by the mobile terminal.

3. The rotary input apparatus of claim 1, wherein a rotation axis is joined to the center portion of the wheel, and the rotation axis is supported by the base.

4. The rotary input apparatus of claim 1, further comprising a guide part adjacent to a perimeter portion of the wheel and joined to the base, for guiding the rotation of the wheel.

5. The rotary input apparatus of claim 1, wherein the control part controls the operation of the driving part to block the electrical power supplied to the detection element when an external signal is received.

6. The rotary input apparatus of claim 1, wherein the electromagnet part comprises a plurality of electromagnets arranged in constant intervals radially about the center of the printed circuit board.

* * * * *